Dec. 3, 1946.  C. V. FIRTH  2,411,873
PROCESS OF MOLDING BALLS
Filed June 15, 1944
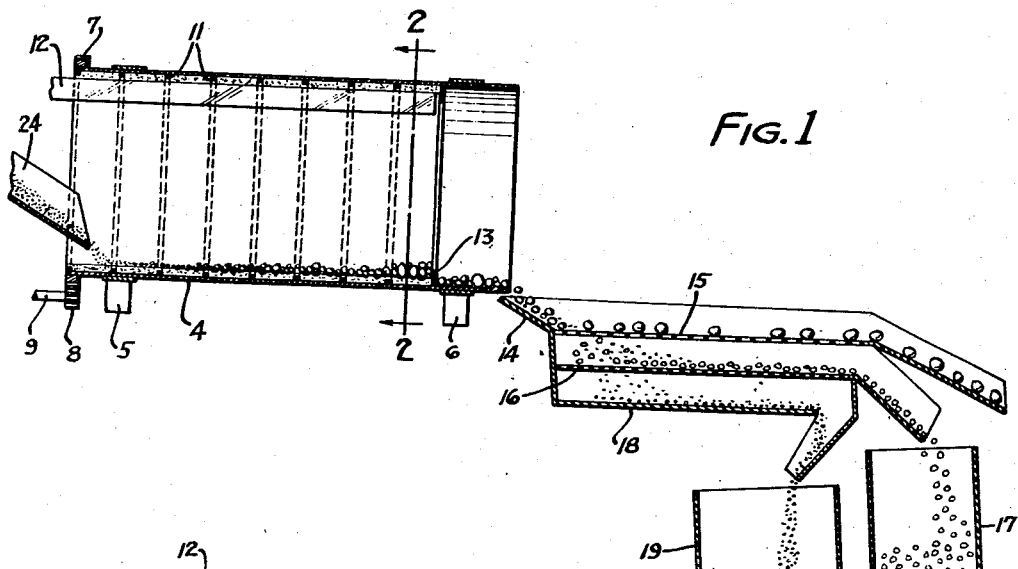
FIG.1
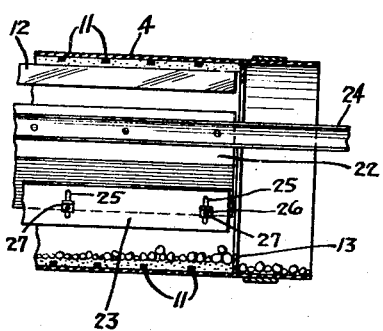
FIG.2
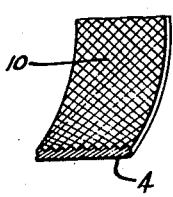
FIG.3
FIG.4
FIG.5
INVENTOR
CHARLES V. FIRTH
By Paul, Paul, Moore
ATTORNEYS Patented Dec. 3, 1946

2,411,873

UNITED STATES PATENT OFFICE 2,411,873

PROCESS OF MOLDING BALLS

Charles V. Firth, Minneapolis, Minn., assignor, by mesne assignments, to Erie Mining Company, Hibbing, Minn., a corporation of Minnesota Application June 15, 1944, Serial No. 540,522

4 Claims. (Cl. 75—3)

This invention relates to a process of producing pressure-hardened balls from pulverulent material at temperatures below the boiling point of water.

It is old in this art to introduce into a rotary drum pulverulent material and water for the purpose of clustering the pulverulent material into larger masses. Such masses are soft, irregular in shape, and possess insufficient mechanical strength for ease and simplicity of further handling or processing.

It is an object of this process to mold balls of the desired size which possess sufficient mechanical strength to be handled by standard equipment such as conveyers, cars, mechanical screens, bins, etc., with substantially no disintegration, deformation or packing.

In this novel process the whole of the pulverulent material is uniformly moistened before introduction into the balling apparatus. Small nuclei are quickly formed and each nucleus rolls over a bed of moistened pulverulent material and, in analogy to a rolling snowball, gradually picks up moistened surface particles and attains the selectively desired size. A great difference in result over the older processes occurs because the finally molded balls are relatively hard, tough, and truly spherical, quite uniform in diameter and possess considerable strength and retention of form.

This radical difference in achievement of this novel process over the prior processes results from the fact that the new process is carried out in such manner that the balls, as they are gradually being molded, exert a substantial pressure upon a thin layer of moist particles while rolling over them and adherently picking them up. For example, in treating fine iron ores, the weight of a rolling ball which has attained a one inch diameter amounts to approximately .065 pound. The diameter of a spherical 200 mesh particle is .00291 inch and therefore the area of the section through its center is .0000067 square inch. Thus the pressure which may result from the weight of a one inch diameter rolling ball upon a single particle is in the range of several thousand pounds per square inch. It has been found that balls of magnetite iron ore molded by this process possess the same density and mechanical strength as would be secured by a pressure of 15,000 pounds per square inch. The balls, as they form in the rotating drum, are continuously abrading one another. Any soft balls or loosely attached particles are quickly worn away and picked up by other balls with the result that the molded balls are hard and smooth.

An object of the invention is to mold substantial balls of the desired diameter from pulverulent material.

Another object is to mold pulverulent material in an initially moistened state into pressure-hardened balls.

Other objects of the invention will become apparent from the following description of a process and apparatus which exemplifies a preferred embodiment of the invention, the apparatus being diagrammatically illustrated in the accompanying drawing in which:

Fig. 1 is a vertical sectional view through the apparatus;

Fig. 2 is a cross-sectional view on the line 2—2 of Fig. 1;

Fig. 3 is a perspective view of a portion of the interior face of a modified form of drum;

Fig. 4 is a view similar to Fig. 2 but of a modified form, the rollers and gears being omitted; and Fig. 5 is a cross-sectional view on the line 5—5 of Fig. 4.

It is to be understood that the invention is not to be considered as limited by the disclosures herein made for the purpose of illustrating the invention in such way that those skilled in the art may be enabled to practice, but it is to be considered as broader in scope and to include such modifications, variations and changes as may fall within the scope of the appended claims.

The pulverulent material to be molded into balls may be of different kinds, and for convenience of explanation, the invention will be described in connection with finely divided iron-containing ores.

There are certain general requirements of the particle-size distribution that is desirable in the pulverulent material for it to possess the necessary properties for ball-molding by this process. If it is desired to mold balls that are sufficiently substantial to be sized on a mechanical screen and handled by standard mechanical means prior to further processing, it is necessary that the pulverulent material be made up of a wide range of particle sizes. Particles entirely or largely of one size, although that size may be quite small, are not satisfactory. Material that could be classified as wholly "sandy" or "granular" cannot be used in this process and neither could material classified as wholly colloidal. However, a mixture of the two may be a satisfactory molding material. As an example, satisfactory ball-molding has been secured with magnetite having the following size analysis.

| Size | Per cent wt. |
| --- | --- |
| Coarser than +88 microns | 20 |
| Between −88 and +44 microns | 15 |
| Between −44 and +20 microns | 30 |
| Between −20 and +10 microns | 25 |
| Smaller than −10 microns | 10 |
| Total | 100 |

Different materials will, of course, respond differently but in this specification the word "pulverulent" is taken to mean a mass of particles of a wide range of sizes, a large proportion of which are smaller than 44 microns (325 mesh).

Moisture is added to the pulverulent ore before the introduction into the rotary drum and can be conveniently mixed with the material in a standard pug mill. As a rule, finer particles require more water. The amount of moisture should be reasonably well controlled. A satisfactory amount for pulverulent magnetite concentrate is eight per centum to eleven per centum by weight of water thoroughly mixed with the material. A simple test for moisture-quantity is to take a handful of the moistened material and compact it or squeeze it. It should form a substantial compact but, if there is moisture left in the hand when you release the compacted material, there is excess moisture dispersed throughout the mass. Another test of proper moisture content is to drop the formed molded balls, as discharged from the rotary drum, upon a steel plate from a height of three feet. If too little moisture was present during formative period, then the balls will shatter, but if moisture content is proper, there will be only a perceptible flattening.

One suitable form of drum-balling machine is shown in the accompanying drawing and includes an elongated metallic drum 4 mounted for rotation upon the pairs of idlers 5 and 6, which are positioned adjacent the opposite ends of the drum. A convenient means for causing rotation of the drum is the provision of an annular gear 7 affixed to the outer circumference of the drum at one end. A pinion 8 meshes with the gear 7 and the shaft 9 of the pinion is connected to a suitable source of power (not necessary to be shown). The drum may be slightly conical or if cylindrical the axis should have a slight tilt from the upper feed end to the lower discharge end. The degree of inclination of the drum's inner surface to the horizontal is relatively slight and may be of the order of half an inch per foot, so that the balls being molded will migrate relatively slowly to the discharge end.

This form of balling apparatus is old in the art but has not been highly successful because it produces fragile masses of irregular shape, size, and density variously called "glomerules," "pellets," "nodules," etc. It has been discovered, however, that if means are provided whereby a comparatively thin, uniform layer of moist, pulverulent material is maintained over the whole interior surface of the drum, an entirely different balling action occurs that results in the production of almost perfect spheres of uniform size. To accomplish this desired effect the inner face of the drum may be provided with a knurled surface 10 as diagrammatically shown in Fig. 3, but it is preferred to provide a series of spaced internal ribs 11. In the drawing there are eight annular ribs shown in Fig. 1, but of course the number thereof may be varied in accordance with the dimensions of the drum and the nature of the pulverulent material and the ribs may be longitudinal or a combination of annular and longitudinal. The height of each internal rib 11 may be one-fourth inch and the ribs spaced two and one-half inches apart. The sole purpose of these ribs is to hold a thin layer of the pulverulent material firmly against the interior surface of the drum and any roughening of this interior surface that accomplishes this result is satisfactory.

In order to limit the thickness of the bed of the material adhering to the inner surface of the rotary drum, a scraper blade 12 is suitably mounted upon a fixed support (not necessary to be shown) adjacent the open feed end of the drum. This scraper blade inwardly extends throughout the major portion of the drum adjacent the inner face of the drum opposite its upper travel. The top edge of this scraper blade projects about one-fourth inch from the top run of the drum ribs. The scraper prevents the formation of a thick or irregular bed in the interior of the drum, the scraped particles dropping downwardly to the lower run.

In the form shown in Fig. 4, the feed hopper extends throughout the major portion of the drum and the ore may be brought to, and distributed throughout, the length of this hopper by a shovel or by a screw conveyer or belt conveyer or other common form of conveyer means, not necessary to be shown. The bottom edge of this hopper 22 has an adjustable plate 23 which regulates the thickness of the layer of the new ore added to the inner surface of the drum. The hopper 22 may be conveniently supported upon a channel iron 24 which extends through the drum and has each of its ends maintained upon a suitable supporting structure not necessary to be shown. The adjustable plate 23 is provided with a plurality of elongated slots 25 through each of which projects a stud 26 affixed to the inclined side of the hopper 22. A nut 27 is received and threaded upon the end of each stud and when each nut 27 is turned down, the plate 23 will be held firmly in its adjustable position. The lower edge of the plate 23 is preferably spaced five-sixteenths of an inch above the top faces of the ribs 11. The adjustable plate 23 controls the initial thickness of the bed of material as the material is being added to the interior of the drum, while the scraper blade 12 also cooperates in maintaining the smoothness and thickness of the bed of material. The particles scraped off by the scraper 12 drop to the lower run of the drum and form nuclei about which the balls quickly form. The form of apparatus shown in Fig. 4 fulfills the requirements above discussed; however, it has been found simpler to make a mechanical drum as shown in Fig. 1. In this drum the ore is fed into the upper open end through the feed spout 24. The ore and any re-cycled under-sized balls enter through the feed spout. The pulverulent moistened ore tends to adhere to the surface of the drum and is carried around the surface of the drum to form a bed upon which the nuclei roll. The scraper blade 12 assures the formation of a comparatively smooth bed of material of controlled thickness and the particles scraped from the upper run of the drum drop and form nuclei. The form of apparatus shown in Figs. 1 and 2 has proved to be commercially practical and its results approximate the results of the apparatus of Fig. 4 with a fair degree of accuracy.

Adjacent the lower open discharge end of the drum there is preferably provided a retaining ring 13 which may be similar to the annular ribs 11 but is of increased height, such for example, as two or three inches. This retaining ring will hold the balls being molded for a slightly longer time than would be the case if the retaining ring were omitted.

At the discharge end of the drum, beyond the retaining ring, it may be preferable to provide an unribbed portion of the drum from which the formed balls are discharged. In this unribbed portion of the drum below the retaining ring the balls rolling directly on the drum surface do not grow materially in size but the ball-surface is hardened and the balls obtain a truly spherical shape.

Because all molded balls do not grow at the same rate, it may be preferable in order to produce uniformity of size to separate them by screening. In the diagrammatic disclosure of the apparatus, the balls roll down the chute 14 to the upper large screen 15 whose mesh may be such as to cause balls having a diameter larger than the desired size to be discharged to the floor or to a receptacle from which they may be returned to the pug mill for reduction and recycling. Those balls which drop through the upper screen 15 are received by the intermediate screen 16 which has a smaller mesh and from which the rolling balls of the desired size drop to a receptacle 17 for recovery while the undersized balls, passing through the intermediate screen 16, will drop to the solid base 18 and be delivered to the receptacle 19 for under-sized balls. As usually operated, the proportion of over-sized balls is small but the proportion of under-sized balls is large, 50% of the weight not being considered excessive. These small balls are returned directly to the upper end of the drum. They circulate through the drum and the screen until they acquire the desired size. Recycling of small balls is a desirable operating condition because this means that the balls are growing slowly in diameter which is a desirable factor in the production of firmly molded balls.

For convenience, in case an operator has inadvertently not imparted sufficient moisture to the initial particles as they enter the rotary drum, a small amount of water may be added through an atomizer.

In the carrying out of this novel process, it is essential that the balls grow slowly and gradually migrate to the lower end of the drum, rolling over the bed of damp particles which coat the interior of the drum and whose thickness is limited by the overhead scraper. The speed of a three foot drum may be of the order of twelve to fifteen R. P. M., but may be varied in accordance with the nature of the material treated. Initially at the feed end of the drum, many fine particles will start rolling over the damp bed and will slowly grow in size by picking up the other particles much in the manner of the growth of a rolling snowball in damp snow. The gradual migration is imparted by the axial tilt of the drum downwardly to the discharge end. As above pointed out in connection with the balling of fine particles, the forming balls exert increasingly greater pressure in rolling over the particles as they are picked up and the exerted pressure may be of the order of several thousand pounds per square inch. The forming balls abrade each other and loosely attached particles are quickly worn away and picked up by other balls. The result of this is the production of molded balls that are hard and smooth and approach perfect spheres.

What I claim is:

1. Process of molding balls from moistened, finely divided ore material which comprises providing a supply of said finely divided ore material having a considerable range of particle sizes including a large proportion of particles smaller than 44 microns diameter, and uniformly moistened with from about 8 to about 11 percent by weight of water, maintaining an adherent layer of the uniformly moistened material against the inside surface of a rotary drum, continuously scraping the formed layer to a smooth even surface, feeding the moist finely divided ore material in uncompacted form together with added discrete nuclei of said uniformly moistened ore material onto said layer, subjecting the supported layer to a slow rotary movement thereby causing the fed material to migrate and the discrete nuclei to roll over the surface of the supported layer and slowly to grow into dense mechanically strong balls by the gradual accretion of moist particles thereto, terminating relative movement between the adherent layered material and the loose material when a portion of said nuclei have grown into balls having a desired size and a portion of said nuclei have grown into balls smaller than said desired size, separating the undersized balls from the balls of desired size, and using the undersized balls as added discrete nuclei in a repetition of the accretionary procedure.

2. The process defined in claim 1, characterized in that the relative movement of the adherent layered material and the loose material is terminated when substantially half of the balled-up material resulting from any single cycle consists of undersized balls which are re-cycled for further growth.

3. The process defined in claim 1, characterized in that the rate of travel of the rotary drum surface is equivalent to that of a drum of three feet diameter revolving at 12-15 R. P. M.

4. Process of molding balls from moistened, finely divided ore material which comprises providing a supply of said finely divided ore material having a considerable range of particle sizes including a large proportion of particles smaller than 44 microns diameter, and uniformly moistened with from about 8 to about 11 percent by weight of moisture, maintaining an adherent layer of the moistened ore material over the interior surface of an inclined rotary drum, continuously scraping the layer to a smooth even surface, feeding discrete nuclei of said moistened ore material onto said layer at the upper end of said drum, rotating said drum at a rate of travel equivalent to that of a drum of three feet diameter revolving at 12-15 R. P. M., thereby causing the nuclei to roll over the surface of the layer and slowly to grow into dense mechanically strong balls by the gradual accretion of moist particles thereto, continuously replacing moist ore material removed from the surface of said layer by the rolling nuclei, removing the rolling material from the drum when approximately half of the same consists of balls having a size smaller than a desired ball size, separating undersized balls from the removed material, and recycling the undersized balls in a repetition of the process.

CHARLES V. FIRTH.